(12) United States Patent
Kolhouse et al.

(10) Patent No.: US 12,270,361 B2
(45) Date of Patent: Apr. 8, 2025

(54) ENGINE SYSTEM COMPONENTS INCLUDING CATALYTIC COATINGS AND RELATED APPARATUSES, METHODS, SYSTEMS, AND TECHNIQUES

(71) Applicant: Cummins Inc., Columbus, IN (US)

(72) Inventors: J. Steven Kolhouse, Columbus, IN (US); Adrian P. Dale, Columbus, IN (US); Brian S. Bower, Hope, IN (US)

(73) Assignee: Cummins Inc., Columbus, IN (US)

( * ) Notice: Subject to any disclaimer, the term of this patent is extended or adjusted under 35 U.S.C. 154(b) by 229 days.

(21) Appl. No.: 18/062,765

(22) Filed: Dec. 7, 2022

(65) Prior Publication Data

US 2023/0095003 A1 Mar. 30, 2023

Related U.S. Application Data

(63) Continuation of application No. PCT/US2021/035820, filed on Jun. 4, 2021.
(Continued)

(51) Int. Cl.
| F02M 26/11 | (2016.01) |
| B01J 23/38 | (2006.01) |
| B01J 37/02 | (2006.01) |
| B01J 37/34 | (2006.01) |
| F02M 26/14 | (2016.01) |

(Continued)

(52) U.S. Cl.
CPC .............. *F02M 26/11* (2016.02); *B01J 23/38* (2013.01); *B01J 37/0215* (2013.01); *B01J 37/348* (2013.01); *F02M 26/14* (2016.02); *F02M 26/29* (2016.02); *F02M 26/35* (2016.02); *F02M 26/68* (2016.02)

(58) Field of Classification Search
CPC ........ F02M 26/11; F02M 26/14; F02M 26/29; F02M 26/35; F02M 26/68; F02M 26/66; F02M 26/72; B01J 23/38; B01J 37/0215; B01J 37/348; B01J 23/42; B01J 35/56; F01N 2510/06

See application file for complete search history.

(56) References Cited

U.S. PATENT DOCUMENTS 2,553,742 A 5/1951 Bloch
6,220,234 B1 4/2001 Baker et al.
(Continued)

FOREIGN PATENT DOCUMENTS

DE 102005049309 4/2007
EP 1404955 4/2004
(Continued)

OTHER PUBLICATIONS

International Search Report and Written Opinion, PCT Appln. Serial No. PCT/US2021/035820, Jun. 26, 2020, 15 pgs.

*Primary Examiner* — Xiao En Mo
(74) *Attorney, Agent, or Firm* — Taft, Stettinius & Hollister LLP

(57) ABSTRACT

Catalytic coatings and techniques for applying the catalytic coatings may be utilized in connection with a number of engine system components including fuel injectors components, exhaust gas recirculation (EGR) valve components, EGR cooler components, piston components, spark plugs, engine valves (intake valves and exhaust valves), engine valve seats, oxygen sensors, NOx sensors, and particulate sensors.

10 Claims, 16 Drawing Sheets

Related U.S. Application Data

(60) Provisional application No. 63/044,422, filed on Jun. 26, 2020.

(51) Int. Cl.
  *F02M 26/29* (2016.01)
  *F02M 26/35* (2016.01)
  *F02M 26/68* (2016.01)

(56) References Cited

U.S. PATENT DOCUMENTS

| | | | |
|---|---|---|---|
| 6,886,548 B2 * | 5/2005 | Suck | F02B 77/04 |
| | | | 123/669 |
| 7,021,557 B2 | 4/2006 | Shafer et al. | |
| 7,712,311 B2 | 5/2010 | Ren et al. | |
| 7,743,816 B2 * | 6/2010 | Mercz | F28D 7/1684 |
| | | | 165/96 |
| 10,018,146 B2 | 7/2018 | Azevedo et al. | |
| 10,220,376 B1 * | 3/2019 | Davidson | F01N 13/16 |
| 2005/0145503 A1 | 7/2005 | Kozlov et al. | |
| 2006/0032485 A1 | 2/2006 | Wilson et al. | |
| 2008/0010986 A1 * | 1/2008 | Fuhrmann | F02B 39/16 |
| | | | 427/372.2 |
| 2008/0142371 A1 | 6/2008 | Gualtieri | |
| 2012/0255280 A1 * | 10/2012 | Genssle | F02D 41/1466 |
| | | | 60/274 |
| 2017/0268457 A1 * | 9/2017 | Azevedo | B01J 37/0244 |

FOREIGN PATENT DOCUMENTS

| | | |
|---|---|---|
| JP | 09317414 | 12/1997 |
| WO | 03098026 | 11/2003 |
| WO | 2015072945 | 5/2015 |

* cited by examiner

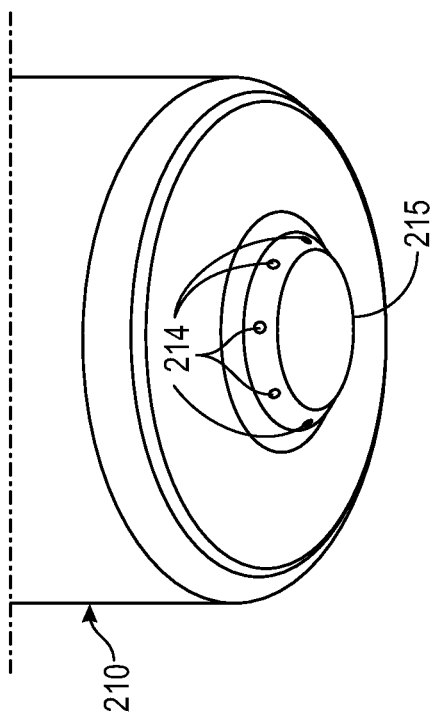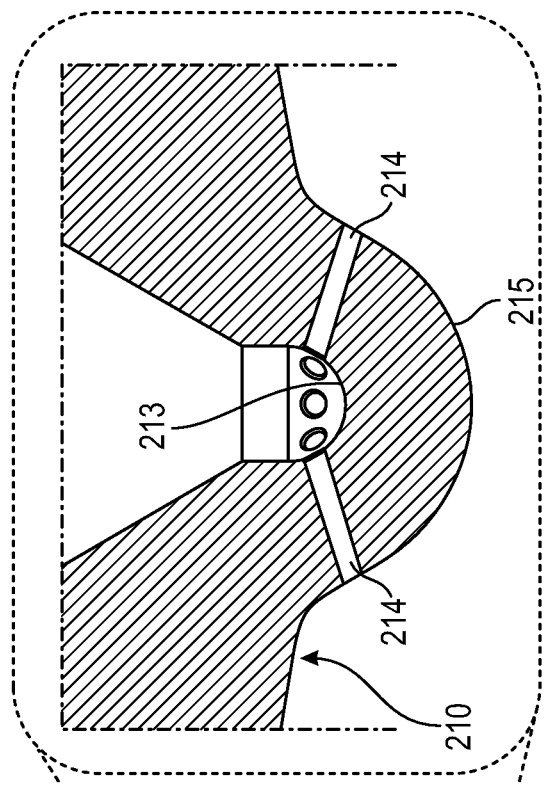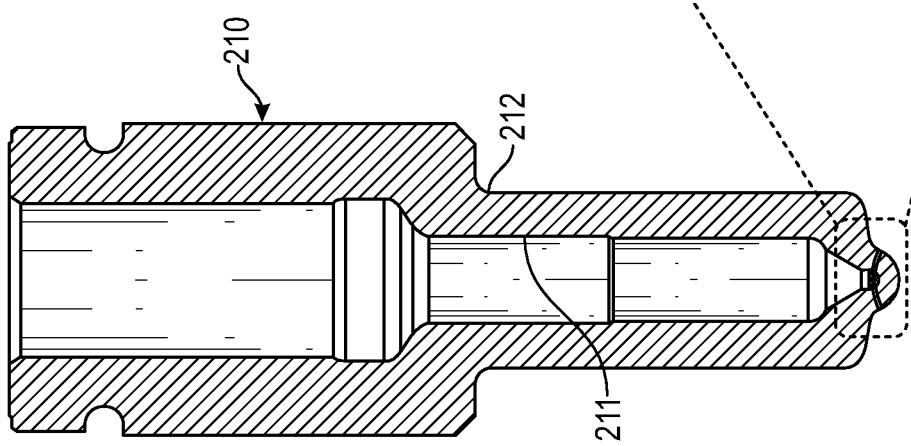
FIG. 4A
FIG. 4B

ENGINE SYSTEM COMPONENTS INCLUDING CATALYTIC COATINGS AND RELATED APPARATUSES, METHODS, SYSTEMS, AND TECHNIQUES

CROSS-REFERENCE

The present application is a continuation of continuation of International Application No. PCT/US21/35820 filed Jun. 4, 2021 which claims priority to and the benefit of U.S. Application No. 63/044,422 filed Jun. 26, 2020, the disclosures of which are hereby incorporated by reference.

BACKGROUND

The present application relates to engine system components including catalytic coatings and related apparatuses, methods, systems, and techniques. A number of proposals have been made to provide engine system components including catalytic coatings. Such proposals suffer from a number of disadvantages, oversights, shortcomings, and unrealized potential. There remains a substantial need for the unique apparatuses, methods, systems, and techniques disclosed herein.

DISCLOSURE OF EXAMPLE EMBODIMENTS

For the purposes of clearly, concisely and exactly describing example embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

BRIEF DESCRIPTION OF THE DRAWINGS

FIG. 4A is a sectional view of the injector nozzle of FIG. 2.

FIG. 4B is a partial perspective view of the injector nozzle of FIG. 2.

DETAILED DESCRIPTION OF EXAMPLE EMBODIMENTS

Figure 1:
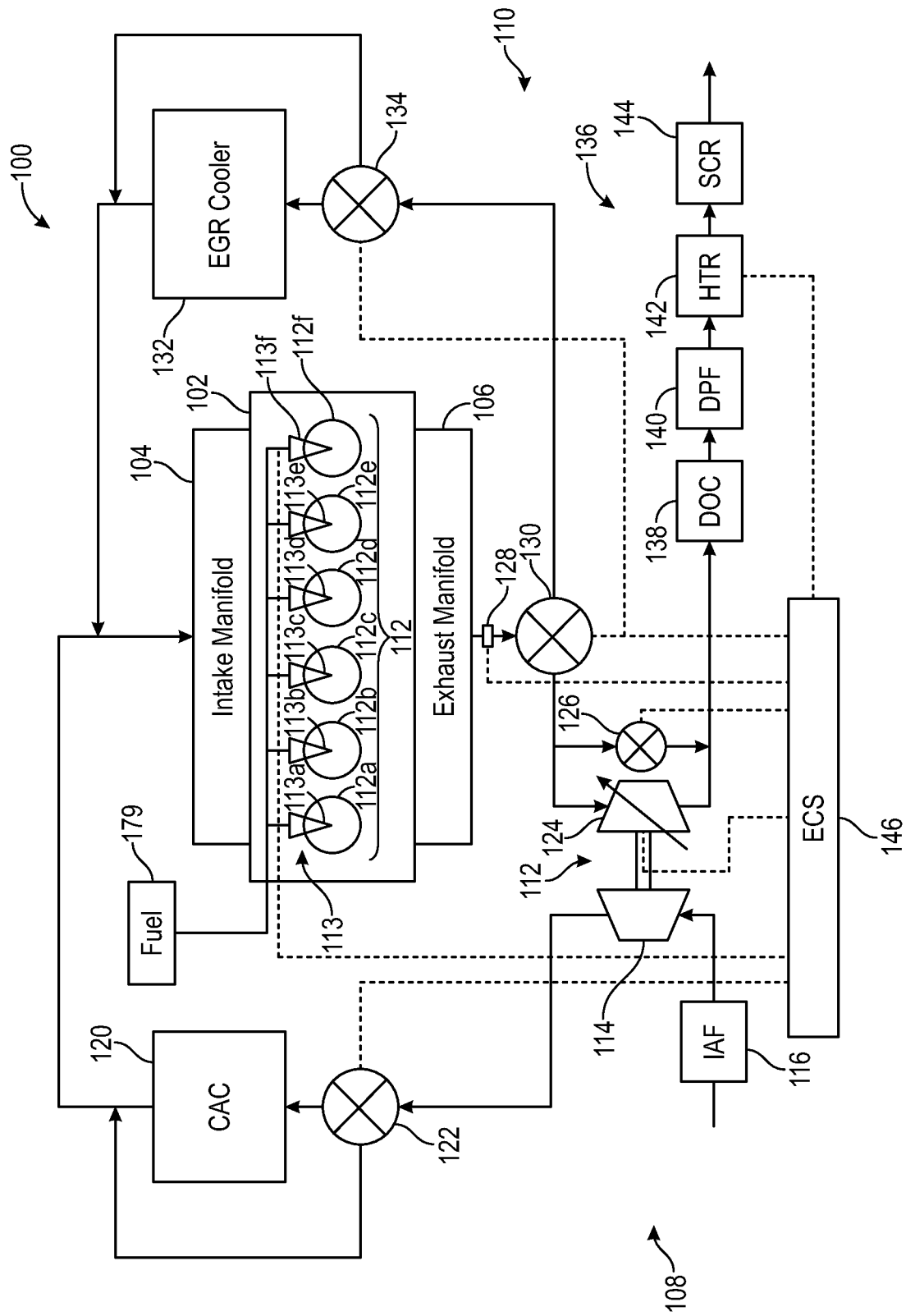
FIG. 1 is a schematic diagram illustrating certain aspects of an example internal combustion engine system.
Figure 2:
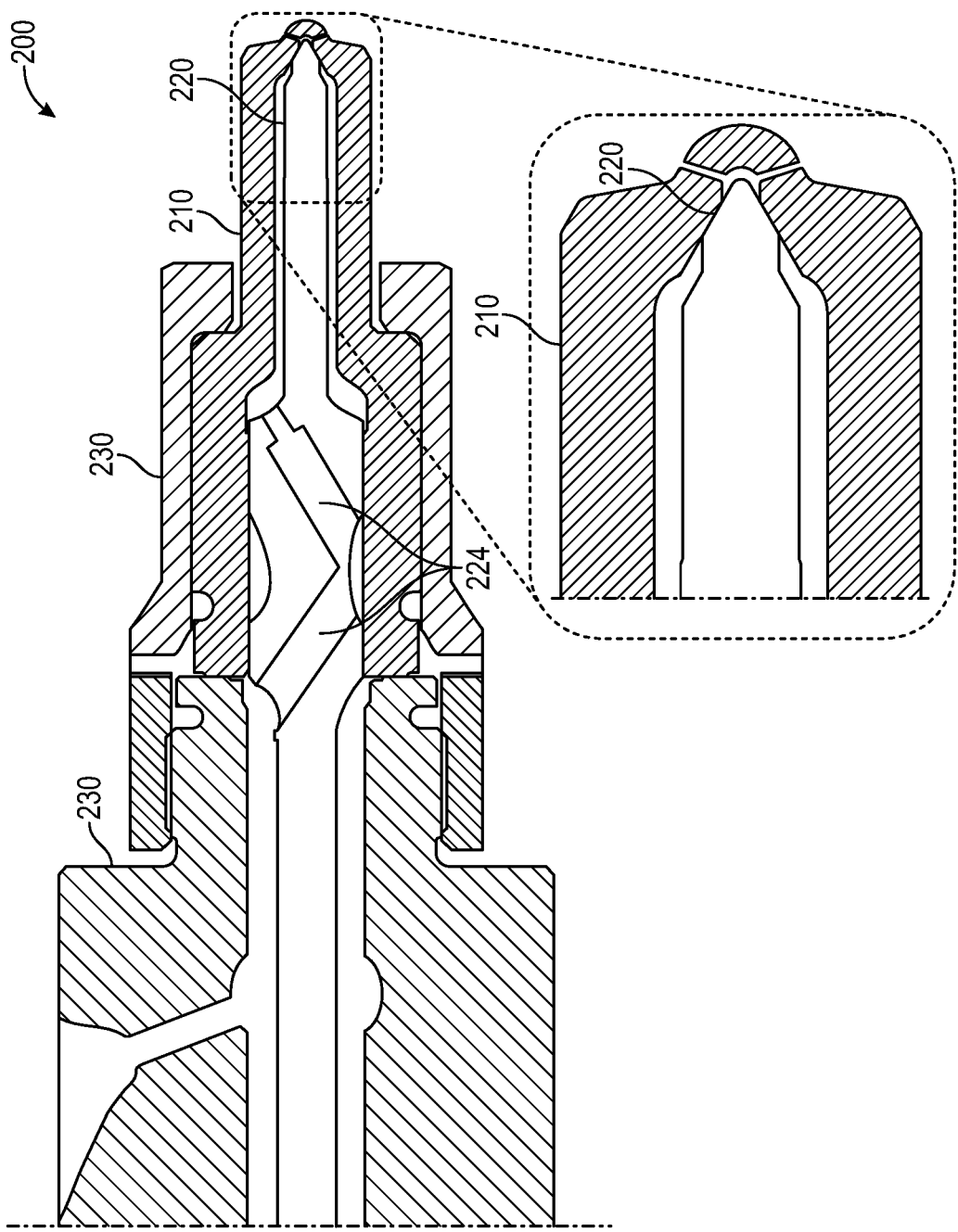
FIG. 2 is a sectional view illustrating certain aspects of an example fuel injector including an injector needle and an injector nozzle.
Figure 3:
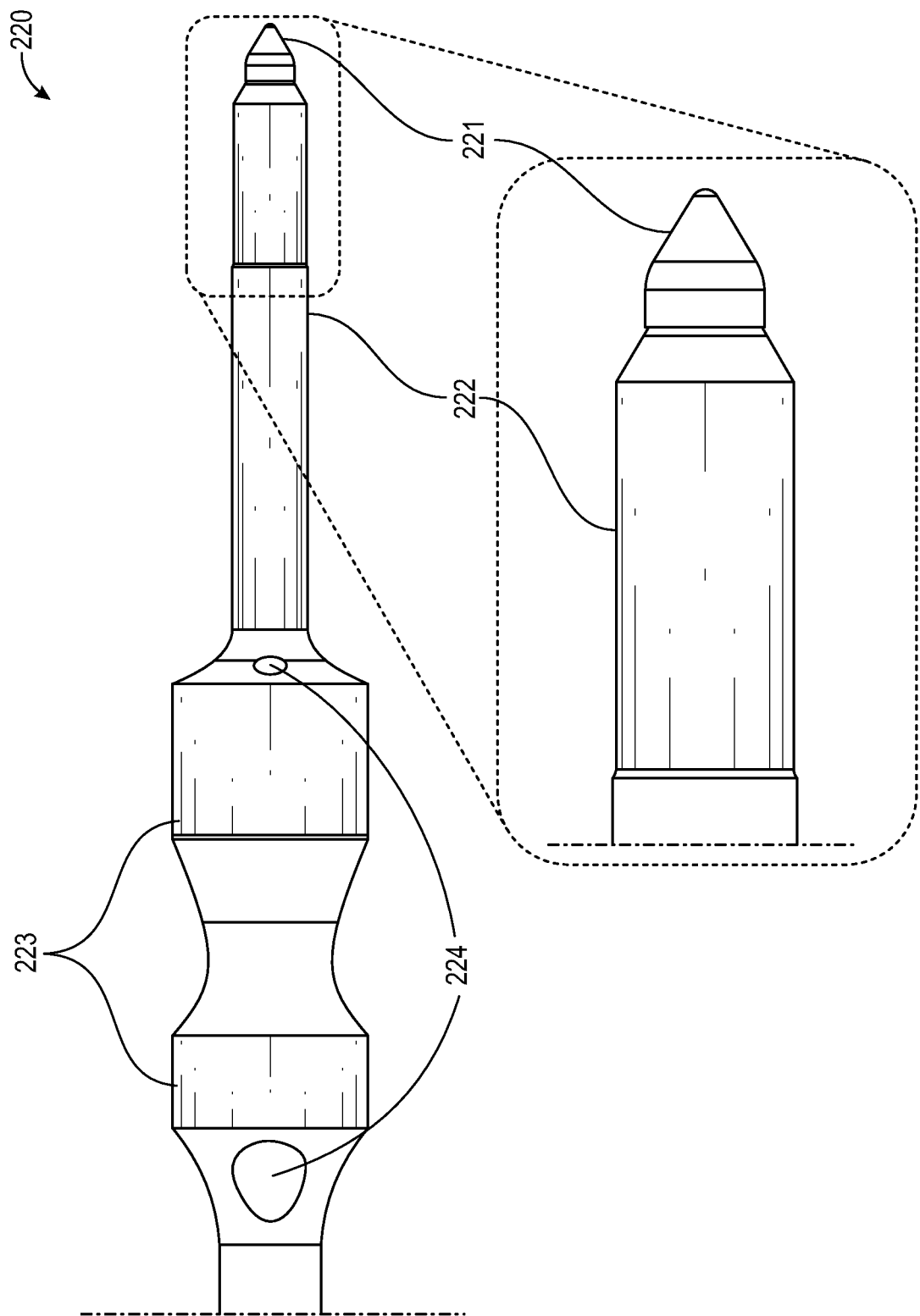
FIG. 3 is a partial side view of the injector needle of FIG. 2.

With reference to FIG. 1, there is illustrated a schematic diagram depicting certain aspects of an example engine system 100 including an engine 102. In the illustrated form, the engine 102 is of a four-stroke, diesel-fueled, Compression Ignition (CI) type with multiple cylinders and corresponding reciprocating pistons coupled to a crankshaft. In other embodiments, engine 102 may be of a different type, including different fueling, different operating cycle(s), different ignition, or the like. It shall likewise be appreciated that the illustrated embodiment of system 100 is but one example of an engine system contemplated by the present disclosure and that a variety of other engine systems including additional or alternate components and features as well as other engine systems not including one or more of the features of the illustrated embodiment are contemplated.

In the illustrated embodiment, system 100 includes an intake system 108 and an exhaust system 110. The engine 102 is in fluid communication with the intake system 108 through which charge air enters an intake manifold 104 and is also in fluid communication with the exhaust system 110, through which exhaust gas resulting from combustion exits by way of an exhaust manifold 106. The engine 102 includes a number of cylinders 113 forming combustion chambers in which a charge flow mixture of fuel and air is combusted. For example, the energy released by combustion powers the engine 102 via pistons in the cylinders connected to a crankshaft. Intake valves control the admission of charge air into the cylinders, and exhaust valves control the outflow of exhaust gas through exhaust manifold 106 and ultimately to the atmosphere. It shall be appreciated that the exhaust manifold 106 may be a single manifold or multiple exhaust manifolds.

The engine 102 includes a plurality of cylinders 112a-112f containing respective reciprocating pistons each connected to a crankshaft by a corresponding connecting rod (not shown) to reciprocally move within the respective cylinder 112a-112f in a standard manner for four-stroke engine operation. Each cylinder 112a-112f includes a combustion chamber with appropriate intake and exhaust valves (not shown) and fuel injectors 113a-113f. Fuel injectors 113a-113f are configured to operate in response to signals from electronic controls described in greater detail hereinafter. Fuel injectors 113a-113f receive fuel from a fuel source (not shown) in fluid communication therewith.

The turbocharger 112 includes a compressor 114 configured to receive intake air from air filter 116 of the intake system 108 and operable to compress ambient air before the ambient air enters the intake manifold 104 of the engine 102 at increased pressure. The air from the compressor 114 is pumped through the intake system 108, to the intake manifold 104, and into the cylinders of the engine 102, typically producing torque on the crankshaft. The intake system 108 includes an intake air filter 116 flow coupled with a charge air cooler (CAC) 120 which is operable to cool the charge flow provided to the intake manifold 104. The intake system 108 also includes a CAC bypass valve 122 which can be opened to route a portion or all of the charge flow to bypass the CAC 120. Adjusting the bypass position of the CAC bypass valve 122 increasingly raises the temperature of the gas returned to the intake manifold 104.

It is contemplated that in the engine system 100, the turbocharger 112 may be a variable geometry turbocharger (VGT) or a fixed geometry turbocharger. A variable geometry turbine allows significant flexibility over the pressure ratio across the turbine. In diesel engines, for example, this flexibility can be used for improving low speed torque characteristics, reducing turbocharger lag and driving exhaust gas recirculation flow. In an example embodiment, the VGT 124 can be adjusted to increase engine load and thereby configured to increase exhaust gas temperature. The engine system 100 also includes a turbine bypass valve 126 to bypass the turbocharger 112. Since cooler ambient air is introduced at the turbocharger 112, opening the turbine bypass valve 126 allows for the turbocharger 112 to be bypassed and maintain a higher intake air temperature at the intake manifold 104.

The exhaust system 110 includes an exhaust gas temperature sensor 128 to sense the temperature of the gas exiting the exhaust manifold 106. The exhaust system 110 includes an exhaust gas recirculation (EGR) valve 130 which recirculates a portion of exhaust gas from the exhaust gas manifold 106 back to the intake manifold 104. The exhaust system 110 includes an EGR cooler (EGR-C) 118 which cools the gas exiting the exhaust gas manifold 106 before the gas returns to the intake manifold 104. The exhaust system 110 may also include an EGR-C bypass valve 134 which can be opened to route a portion or all of the recirculated exhaust gas from the exhaust gas manifold 106 to bypass the EGR-C 132. By increasing the amount of gas that bypasses the EGR-C 132, the temperature of the gas returning to the intake manifold 104 is increased. It shall be appreciated that the intake system 108 and/or the exhaust system 110 may further include various components not shown, such as additional coolers, valves, bypasses, intake throttle valves, exhaust throttle valves, and/or compressor bypass valves, for example.

The system 100 includes an exhaust aftertreatment (AT) system 136 which includes a diesel oxidation catalyst (DOC) 138, a diesel particulate filter (DPF) 140, aftertreatment (AT) heater 142, and a selective catalytic reduction (SCR) 144. In the example embodiment, the AT heater 142 is optionally included in the AT system 136 to increase the temperature of the exhaust gas provided to the SCR 144 within the AT system 136. It should be noted that AT heater 142 can include one or more electric and/or fuel-based heaters.

The engine system 100 further includes a controller 146 structured to perform certain operations and to receive and interpret signals from any component and/or sensor of the engine system 100. It shall be appreciated that the controller 146 may be provided in a variety of forms and configurations including one or more computing devices forming a whole or a part of a processing subsystem having non-transitory memory storing computer-executable instructions, processing, and communication hardware. The controller 146 may be a single device or a distributed device, and the functions of the controller 146 may be performed by hardware or software. The controller 146 is in communication with any actuators, sensors, datalinks, computing devices, wireless connections, or other devices to be able to perform any described operations.

The controller 146 may include one or more non-transitory memory devices configured to store instructions in memory which are readable and executable by the controller 146 to control operation of engine 102 as described herein. Certain control operations described herein include operations to determine one or more parameters. Controller 146 may be configured to determine and may perform acts of determining in a number of manners, for example, by calculating or computing a value, obtaining a value from a lookup table or using a lookup operation, receiving values from a datalink or network communication, receiving an electronic signal (e.g., a voltage, frequency, current, or pulse-width modulation (PWM) signal) indicative of the value, receiving a parameter indicative of the value, reading the value from a memory location on a computer-readable medium, receiving the value as a run-time parameter, and/or by receiving a value by which the interpreted parameter can be calculated, and/or by referencing a default value that is interpreted to be the parameter value.

Controller 146 is one example of a component of an integrated circuit-based electronic control system (ECS) that may be configured to control various operational aspects of vehicle 100 and powertrain 102 as described in further detail herein. An ECS according to the present disclosure may be implemented in a number of forms and may include a number of different elements and configurations of elements. In certain forms, an ECS may incorporate one or more microprocessor-based or microcontroller-based electronic control units sometimes referred to as electronic control modules. An ECS according to the present disclosure may be provided in forms having a single processing or computing component, or in forms comprising a plurality of operatively coupled processing or computing components; and may comprise digital circuitry, analog circuitry, or a hybrid combination of both of these types. The integrated circuitry of an ECS and/or any of its constituent processors/controllers or other components may include one or more signal conditioners, modulators, demodulators, arithmetic logic units (ALUs), central processing units (CPUs), limiters, oscillators, control clocks, amplifiers, signal conditioners, filters, format converters, communication ports, clamps, delay devices, memory devices, analog to digital (A/D) converters, digital to analog (D/A) converters, and/or different circuitry or functional components as would occur to those skilled in the art to provide and perform the communication and control aspects disclosed herein.

The present disclosure contemplates that a number of components of an engine system, such as engine system 100 or another engine system, may benefit from the application of one or more catalytic coatings. Such components include fuel injectors components, exhaust gas recirculation (EGR) valve components, EGR cooler components, piston components, spark plugs, engine valves (intake valves and exhaust valves), engine valve seats, oxygen sensors, NOx sensors, and particulate sensors.

A number of catalytic coatings are contemplated and may be referred to herein as catalytic coatings according to the present disclosure. Some embodiments of catalytic coatings according to the present disclosure comprise one or more noble metal components. The noble metal component of catalytic coatings according to the present disclosure components may comprise one or more noble metals, for example, platinum (Pt), palladium (Pd), gold (Au), silver (Ag), ruthenium (Ru), rhodium (Rh), osmium (Os), iridium (Ir), or combinations of two or more of the foregoing noble metals. Some embodiments contemplate the use of a catalyst coating comprising at least one noble metal component selected from the group consisting of Au, Pd, Pt, Ru, Rh, Os, and Ir.

Some embodiments of a catalytic coating according to the present disclosure contemplate two-component catalyst coatings comprising a noble metal component and a ceramic component. Some such embodiments include an inner coating component or barrier layer comprising a ceramic component. The ceramic component may comprise silica ($SiO_2$), alumina ($Al_2O_3$), tantala ($Ta_2O_5$), hafnia ($HfO_2$), yttria ($Y_2O_3$), or chemical combinations of silica with boron and/or phosphorous and/or alumina. Some such embodiments contemplate a ceramic component consisting entirely of one of these ceramic materials or a combination of two or more of these ceramic materials. Non-limiting examples of two-component catalyst coatings including a ceramic component and a platinum component may be found, for example, in U.S. Pat. Nos. 7,311,979 and 7,326,469, the disclosures of which are incorporated herein by reference.

A number of techniques may be utilized to apply a catalytic coating according to the present disclosure to one or more surfaces of one or more components of an engine system. Such techniques may be referred to herein as coating techniques according to the present disclosure and may include, for example, spray coating, vapor deposition, vacuum deposition, thermal decomposition, chemical vapor plating, electroless plating, electroplating, dip coating, aqueous electroplating, fused salt electroplating, metallic bonding, metalizing, combinations of two or more of the foregoing techniques, and/or combinations of one or more of the foregoing techniques and other techniques as would occur to one of skill in the art with the benefit of the present disclosure. It shall be appreciated that the catalytic coatings according to the present disclosure and the coating techniques according to the present disclosure may be utilized in connection with a number of engine system components including fuel injectors components, exhaust gas recirculation (EGR) valve components, EGR cooler components, piston components, spark plugs, engine valves (intake valves and exhaust valves), engine valve seats, oxygen sensors, NOx sensors, and particulate sensors, several examples of which shall now be further described.

With reference to FIGS. 2, 3, 4A, and 4B, there are illustrated several views of an example fuel injector 200 and a number of its constituent structures. In the illustrated embodiment, the fuel injector 200 is structured for direct injection into a cylinder or other combustion chamber of an engine system and for operation with a high-pressure, common-rail diesel injection system wherein the injector nozzle 210 and the injector needle 220 are exposed to carbon compounds in a high-temperature environment (e.g., about 300° C. or greater) associated with the injection process and resulting combustion reaction. It is further contemplated that the fuel injector 200 may additionally or alternatively be structured for use in other applications in which one or more structures of the fuel injector 200 are exposed to carbon compounds in a high-temperature environment.

The fuel injector 200 includes an injector nozzle 210, an injector needle 220, a nozzle retainer 230, and an injector body 240. Fuel injector 200 also includes a number of additional constituent parts and components which are not depicted in the illustrated views, examples of which may be found in U.S. Pat. No. 10,077,748 B2, U.S. Pat. No. 9,719,476 B2, and U.S. Patent Application Publication No. 2018/0363616 A1, the disclosures of which are hereby incorporated by reference. In other embodiments, the fuel injector 200 may include a number of additional and/or alternative components and configurations including an injector needle and an injector nozzle as will occur to one of skill in the art with the benefit of the present disclosure.

The injector nozzle 210 includes a plurality of surfaces including a nozzle inner diameter (ID) surface 211, a nozzle outer diameter (OD) surface 212, a nozzle sac surface 213, a plurality of nozzle spray hole surfaces 214, and a nozzle tip surface 215. A catalytic coating according to the present disclosure may be provided on at least a portion of one or more of the aforementioned plurality of surfaces of the injector nozzle 210. In certain embodiments, a catalytic coating according to the present disclosure is provided on one of (a) at least the nozzle ID surface 211, (b) at least the nozzle ID surface 211 and the nozzle sac surface 213, (c) at least the nozzle ID surface 211, the nozzle sac surface 213, and the plurality of nozzle spray hole surfaces 214, (d) at least the nozzle ID surface 211, the nozzle sac surface 213, the plurality of nozzle spray hole surfaces 214, and the nozzle tip surface 215, or (e) at least the nozzle ID surface 211, the nozzle sac surface 213, the plurality of nozzle spray hole surfaces 214, the nozzle tip surface 215, and the nozzle OD surface 212. In certain embodiments, a catalytic coating according to the present disclosure is provided on at least a combination of two or more of the nozzle ID surface 211, the nozzle OD surface 212, the nozzle sac surface 213, the plurality of nozzle spray hole surfaces 214, and the nozzle tip surface 215. In certain embodiments, a catalytic coating according to the present disclosure is provided on at least a combination of three of or more of the nozzle ID surface 211, the nozzle OD surface 212, the nozzle sac surface 213, the plurality of nozzle spray hole surfaces 214, and the nozzle tip surface 215. In certain embodiments, a catalytic coating according to the present disclosure is provided on at least the nozzle sac surface 213, the plurality of nozzle spray hole surfaces 214, and the nozzle tip surface 215.

The injector needle 220 includes a plurality of surfaces including a needle tip surface 221, a first shaft portion surface 222, and fluid channel body portion surface 223 defining fluid channel surfaces 224. A catalytic coating according to the present disclosure may be provided on at least a portion of one or more of the aforementioned plurality of surfaces of the injector needle 220. A catalytic coating according to the present disclosure may be provided on at least a portion of one or more of the aforementioned plurality of surfaces of the injector needle 220. In certain embodiments, a catalytic coating according to the present disclosure is provided on one of (a) at least the needle tip surface 221, (b) at least the needle tip surface 221 and the first shaft portion surface 222, (c) at least the needle tip surface 221, the first shaft portion surface 222, and the fluid channel body portion surface 223, and (d) at least the needle tip surface 221, the first shaft portion surface 222, the fluid channel body portion surface 223, and the fluid channel surfaces 224. In certain embodiments, a catalytic coating according to the present disclosure is provided on at least a combination of two or more of the needle tip surface 221, the first shaft portion surface 222, the fluid channel body portion surface 223, and the fluid channel surfaces 224. In certain embodiments, a catalytic coating according to the present disclosure is provided on at least a combination of three of or more of the needle tip surface 221, the first shaft portion surface 222, the fluid channel body portion surface 223, and the fluid channel surfaces 224.

It is further contemplated that catalytic coating according to the present disclosure may be provided on may be provided on additional or alternate surfaces of injector nozzle 210 or other injector nozzles, injector needle 220 or other injector needles, or other surfaces of the fuel injector 200 or other fuel injectors that exposed to carbon compounds at an elevated-temperature environment during operation of an internal combustion engine system.

Figure 5:
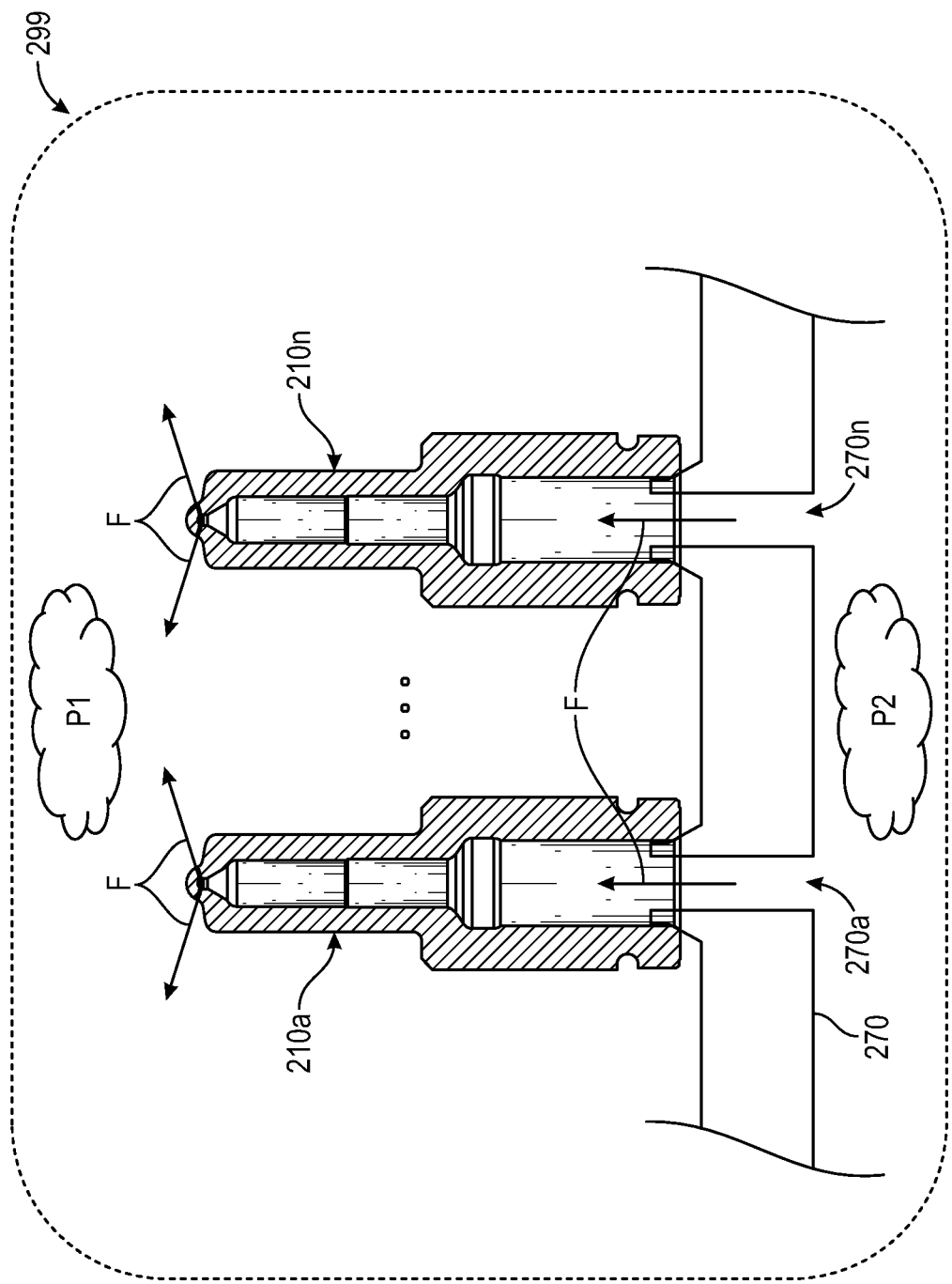
FIG. 5 is a schematic diagram illustrating certain aspects of an example fuel injector component coating system.

With reference to FIG. 5, there is illustrated an example fuel injector component coating system 299 which may be used in connection with one or more of the coating techniques according to the present disclosure. The fuel injector component coating system 299 includes a jig 270 adapted to receive and temporarily retain one or more fuel injector components which, in the illustrated embodiment, comprise a plurality of injector nozzles 210a-210n. The jig 270 includes a plurality of flow apertures 270a-270n in flow communication with respective ones of the plurality of injector nozzles 210a-210n.

A pressure differential indicated by pressure P1 and pressure P2 is provided on opposite sides of the jig 270 and plurality of injector nozzles 210a-210n and is effective to promote flow through and coating of the interior surfaces of the plurality of injector nozzles 210a-210n, for example, respective nozzle ID surfaces, nozzle sac surfaces, and nozzle spray holes of injector nozzles 210a-210. In the illustrated embodiment, the pressure differential comprises P2 being greater than P1 which promotes flow through and coating of the interior surfaces of the plurality of injector nozzles 210a-210n in the direction generally indicated by arrows F. In other embodiments, the pressure differential may comprise P1 being greater than P2 which promotes flow through and coating of the interior surfaces of the plurality of injector nozzles 210a-210n in the direction generally opposite of that indicated by arrows F.

The pressure differential may be provided using a number of techniques including drawing a partial vacuum, application of positive pressure, impingement of fluid flow, application of fans, blowers, sprayers or atomizing nozzle flows, combinations of such techniques with one another, and/or combinations of such techniques and other techniques as would occur to one of skill in the art with the benefit of the present disclosure. The pressure differential may be provided in connection with a number of the coating techniques according to the present disclosure, including, for example, spray coating, vapor deposition, vacuum deposition, chemical vapor plating, and/or other coating techniques according to the present disclosure or combinations thereof.

Figure 6:
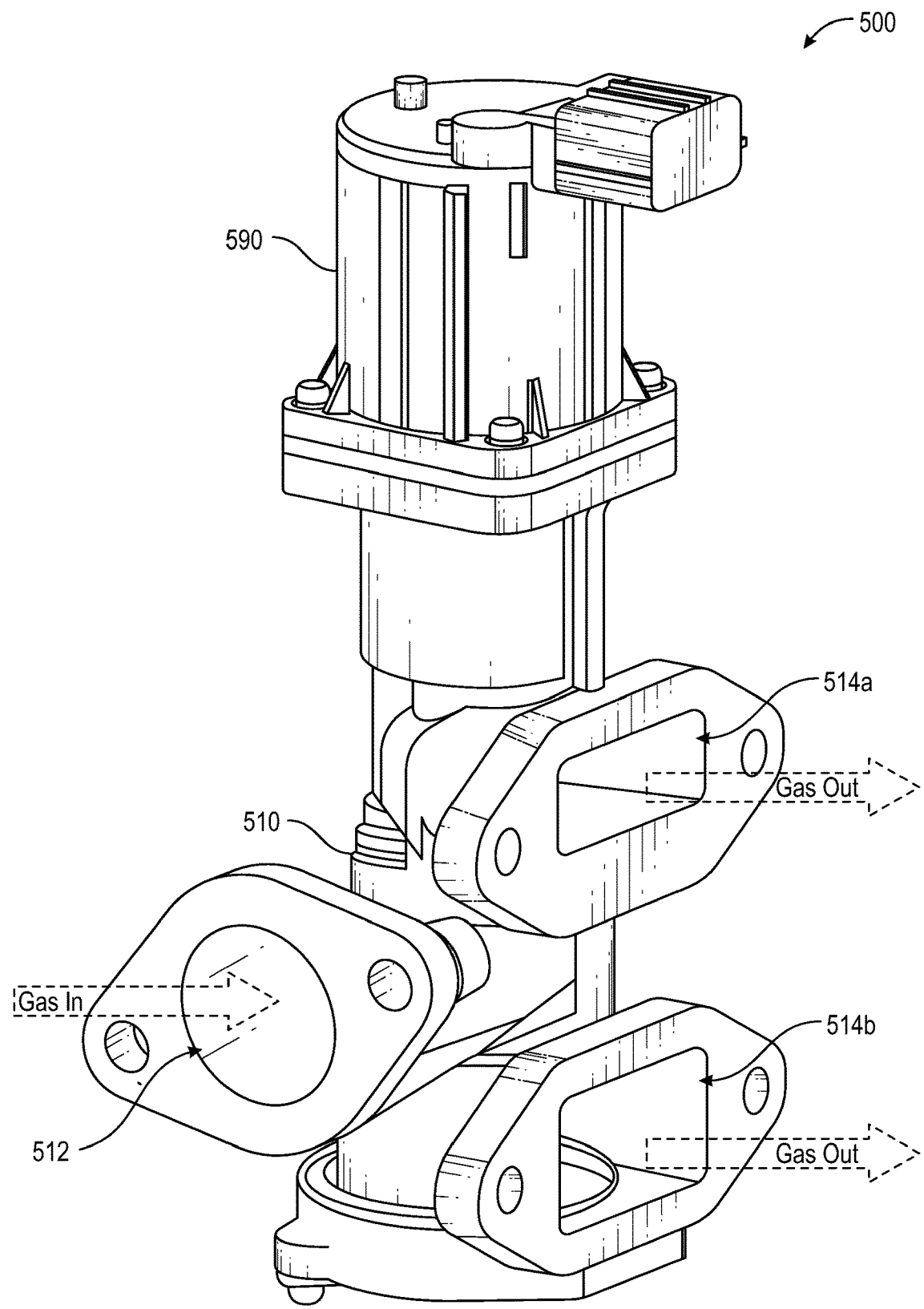
FIG. 6 is a sectional view illustrating certain aspects of an example EGR valve.
Figure 7:
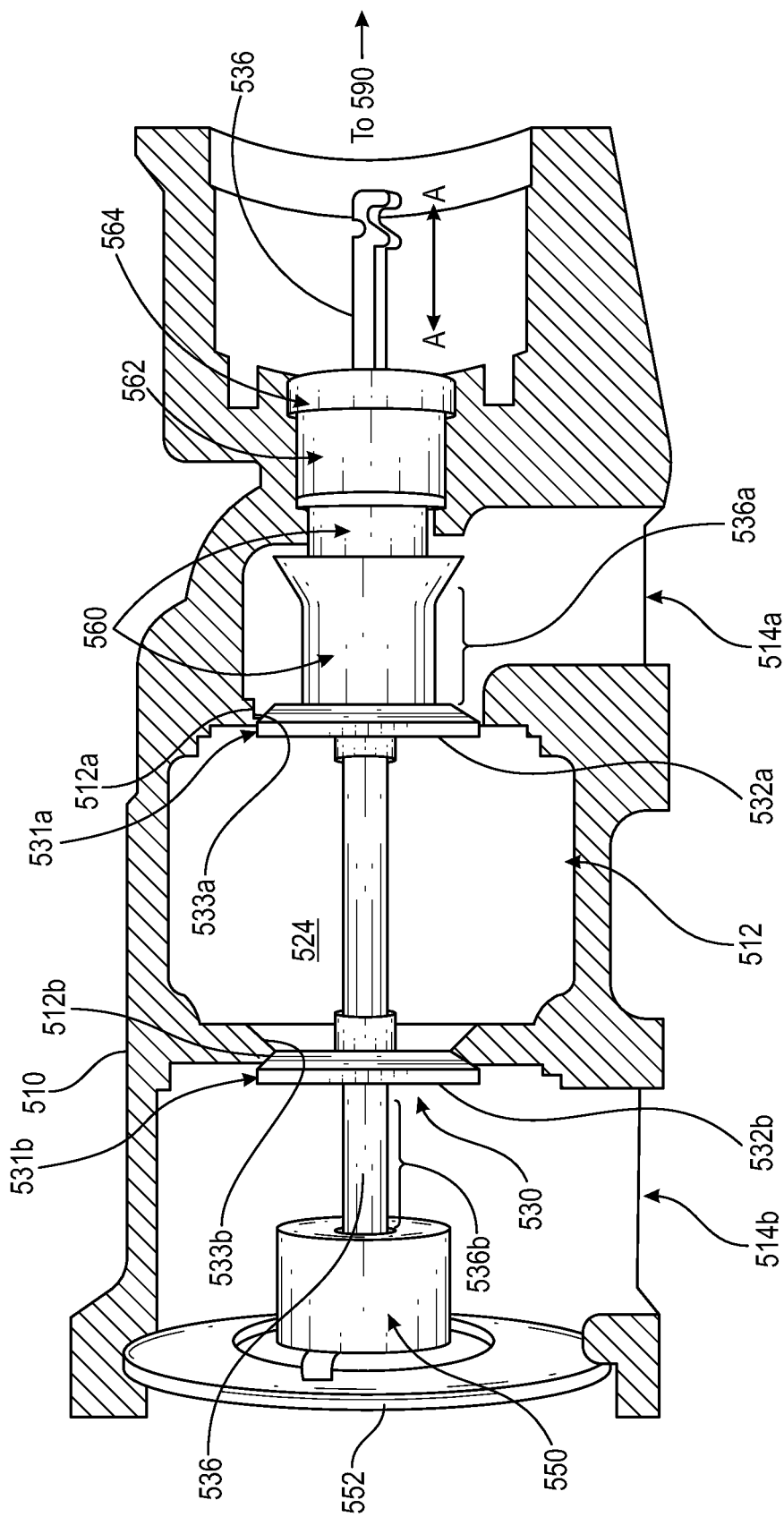
FIG. 7 is a sectional view illustrating certain aspects of the EGR valve of FIG. 6.

With reference to FIGS. 6 and 7, there are illustrated several views of an example exhaust gas recirculation (EGR) valve device 500. The EGR valve device 500 includes an EGR valve body 510 and an EGR valve 530 which is operatively coupled with an actuator 590. The EGR valve body 510 includes a flow passage 524 extending between a gas inlet 512 and gas outlets 514a, 514b. The EGR valve 530 includes valve heads 532a, 532b and a shaft 536 moveable within the interior flow passage 524 to selectably seat and unseat seating surfaces 533a, 533b of the valve heads 532a, 532b on body seating surfaces 512a, 512b of the EGR valve body 510 at seating interfaces 531a, 531b.

A first end of the shaft 536 extends into a scrubber 550 toward a closed end 552 of the valve body 510. A second end of the shaft 536 extends through soot guard 560, bushing 562, and shaft seal 564, and is coupled with actuator 590. The actuator 590 is configured and operable to move the shaft 536 in an axial direction generally indicated by arrow A-A. During motion of the shaft 536 in the axial direction a first portion 536a of shaft 536 travels into and out of the soot guard 560 and second portion 536b of shaft 536 travels into and out of the scrubber 550.

It shall be appreciated that a number of additions, modifications, and variations of the illustrated EGR valve device 500 are contemplated in additional or alternative embodiments. For example, in the illustrated embodiment, EGR valve body 510 is provided with two gas outlets 514a, 514b, two valve heads 531a, 531b, and two seating interfaces 531a, 531b; however, embodiments with a greater or lesser number of gas outlets, valve heads, and seating interfaces are contemplated, for example. Furthermore, the size, position, geometry, motion type and direction, and other attributes of the EGR valve device 500 may vary from the illustrated example.

A catalytic coating according to the present disclosure may be provided on at least a portion of one or more of the EGR valve body 510, the valve heads 532a, 532b, and the shaft 536. The catalytic coating may be provided in a number of areas of the EGR valve body 510, the valve heads 532a, 532b, and/or the shaft 536, or in correlated or corresponding locations of other EGR valve devices. In some embodiments, the catalytic coating may be provided on one or more of (a) at least a portion of the head seating surfaces 533a, 533b, (b) at least a portion of the body seating surfaces 512a, 512b, and (c) at least a portion of the shaft 536. In certain embodiments, the catalytic coating may be provided on at least a portion of the head seating surface 533a, 533b, and at least a portion of the body seating surface 512a, 512b. In certain such embodiments, the catalytic coating may additionally or alternatively be provided on at least a portion of the shaft which moves in and out of the interior flow passage as the EGR valve moves to selectably seat and unseat the head seating surface of the valve head from the body seating surface of the EGR valve body. In certain such embodiments, the catalytic coating may be provided on at least each of the portion of the head seating surface, the portion of the body seating surface, and the portion of the shaft.

The application and/or presence of a catalytic coating according to the present disclosure may be provided on may also encompass preferred portions of one or more of the foregoing components. In certain such forms, the catalytic coating is provided on one of 70% or more, 80% or more, and 90% or more of the outer surface of the EGR valve. In certain such forms, the catalytic coating is provided on one of 70% or more, 80% or more, and 90% or more of the flow passage of the EGR valve body. In certain such forms, the catalytic coating is applied to at least one of a portion of the EGR valve body and a portion of the EGR valve by spray coating, dipping, electrostatic plating, or coating techniques according to the present disclosure. The application of a catalytic coating according to the present disclosure may occur prior to or after assembly of the EGR valve 500.

Figure 8A:
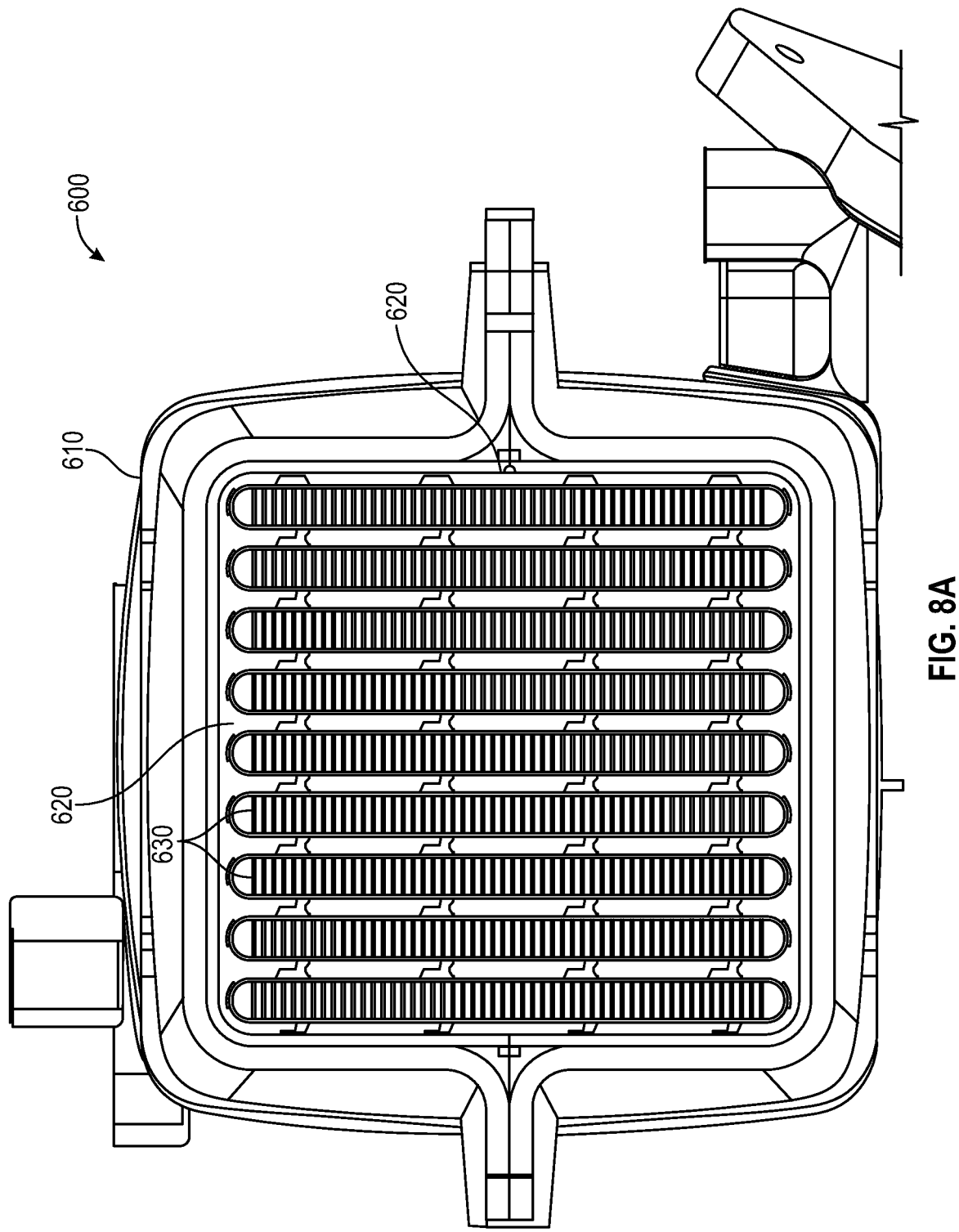
FIG. 8A is a first a sectional view illustrating certain aspects of an example EGR cooler.
Figure 8B:
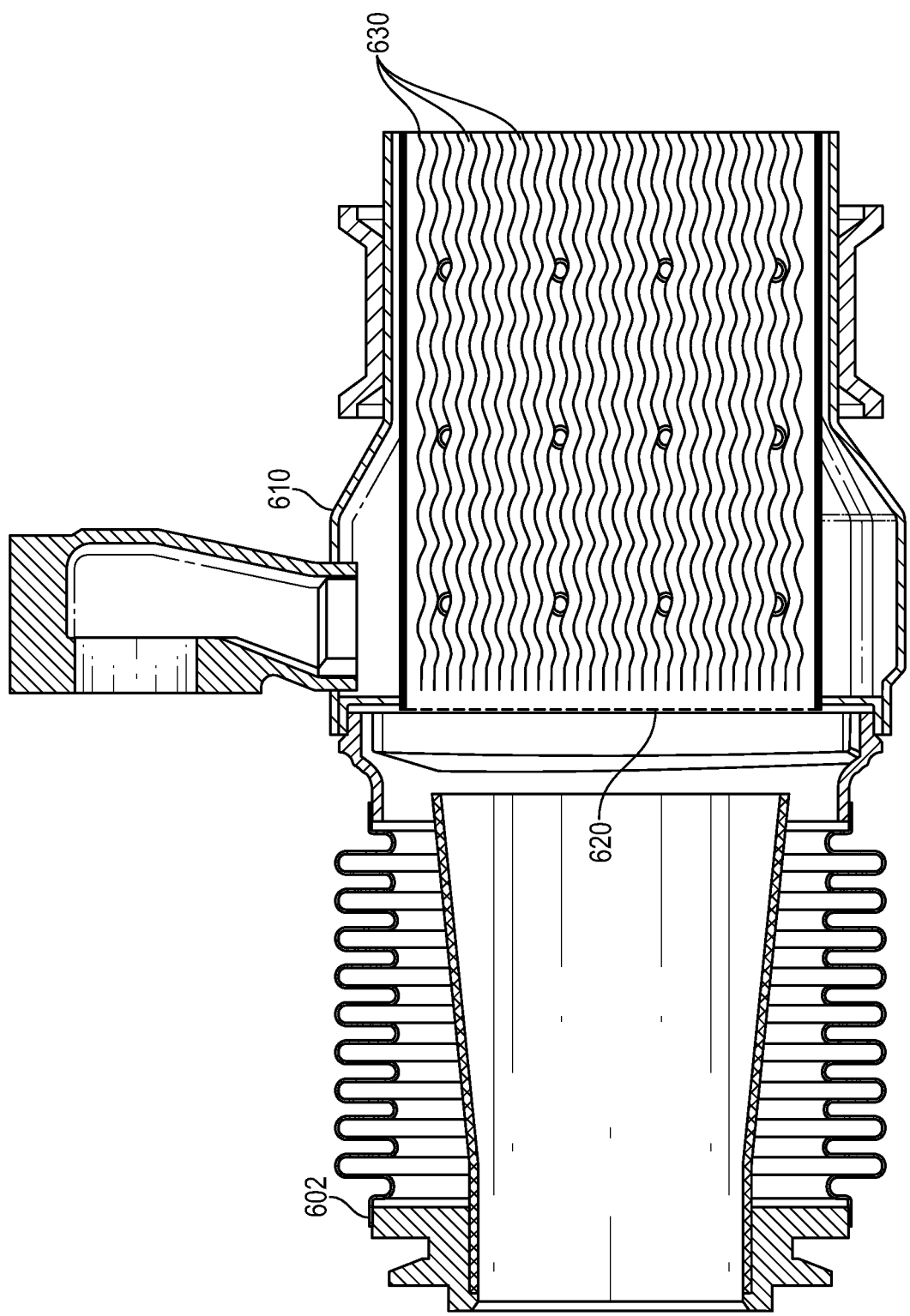
FIG. 8B is a second a sectional view illustrating certain aspects of the example EGR cooler of FIG. 8A

With reference to FIGS. 8A and 8B, there are illustrated several sectional views of an example exhaust gas recirculation (EGR) cooler 600 which includes a header 602, a cooler housing 610, a header plate 620 and a plurality of wall members 630 defining exhaust flow passages. A catalytic coating according to the present disclosure may be provided on at least a portion of the plurality of wall members 630 defining exhaust flow passages, and/or at least a portion of the header plate 620. In certain embodiments, catalytic coatings according to the present disclosure may be provided on one of 20% or more, 25% or more, 30% or more, and 35% or more of the length of the plurality of exhaust flow passages as measured from the inlet side. In certain embodiments, catalytic coatings according to the present disclosure may be applied by spray coating of at least one of (a) at least a portion of the plurality of exhaust flow passages, and (b) at least a portion of the header plate. In certain embodiments, the catalytic coating may be the catalytic coating is applied by dip coating of at least one of (a)

at least a portion of the plurality of exhaust flow passages, and (b) at least a portion of the header plate. In certain embodiments, the catalytic coating may be applied by electrostatic plating of at least one of (a) at least a portion of the plurality of exhaust flow passages, and (b) at least a portion of the header plate. In certain embodiments, at least a portion of the catalytic coating is applied using the pressure differential between the gas inlet side and the gas outlet side utilizing similar techniques as those described above in connection with FIG. 5. In certain embodiments, at least a portion of the catalytic coating is applied using air circulation toward at least one of the gas inlet side and the gas outlet side. In certain embodiments, the catalytic coating may be applied prior to assembly of the EGR cooler.

Figure 9:
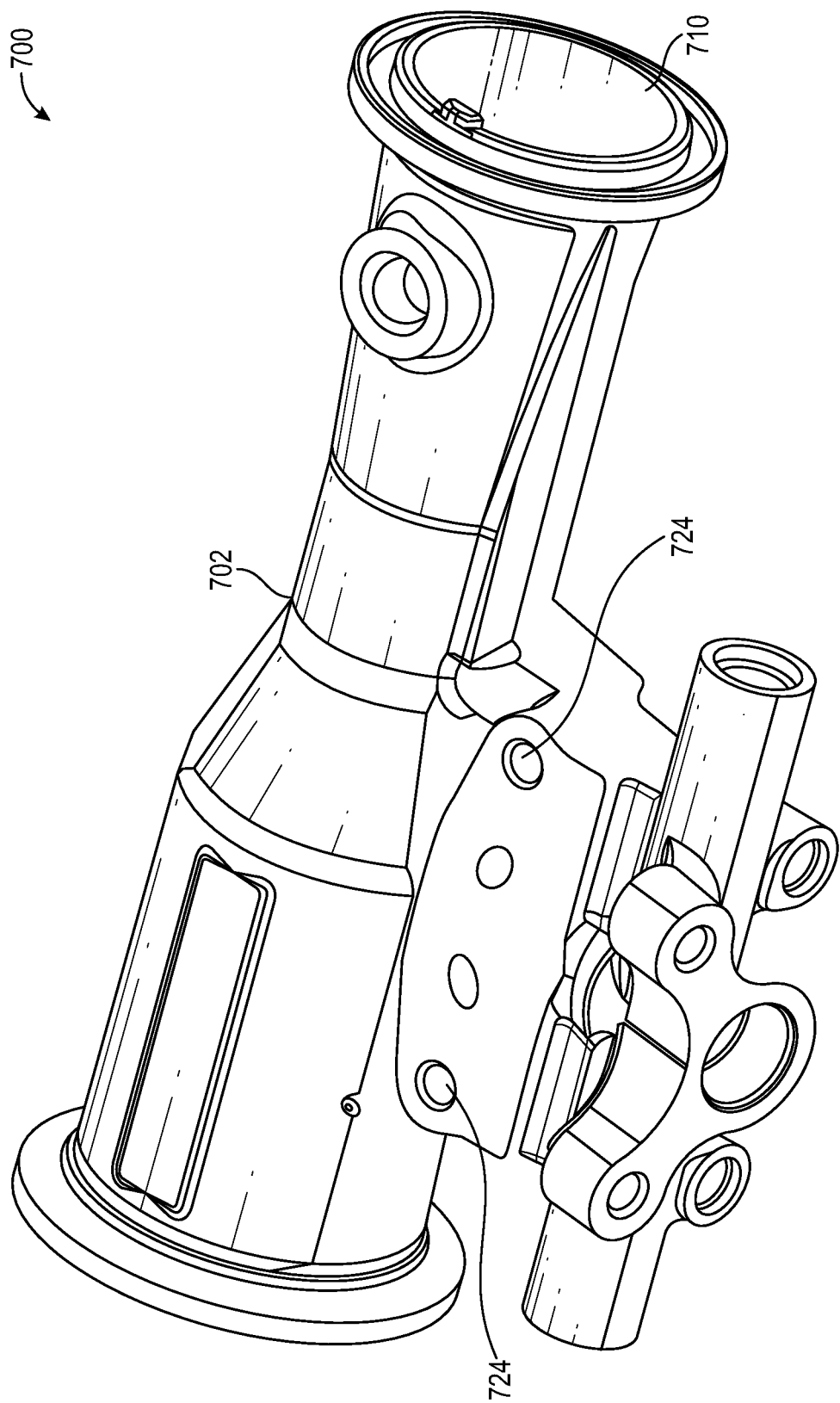
FIG. 9 is a perspective view illustrating certain aspects of an example EGR mass flow measurement device.

With reference to FIG. 9, there are illustrated a perspective views of an example exhaust gas recirculation (EGR) mass flow measurement device 700 including body 702 an interior surface 710 defining an exhaust flow passage, and pressure sensor tubes 722, 724 providing pressure sensor access to the exhaust flow passages at first and second locations along the exhaust flow passage. A catalytic coating according to the present disclosure may be provided on at least a portion of the interior surface 710 and/or one or both of the pressure sensor tubes 722, 724 and may be applied using the coating techniques according to the present disclosure, including, for example, electroless plating, dip coating aqueous electroplating, fused salt electroplating, or other coating techniques according to the present disclosure.

Figure 10:
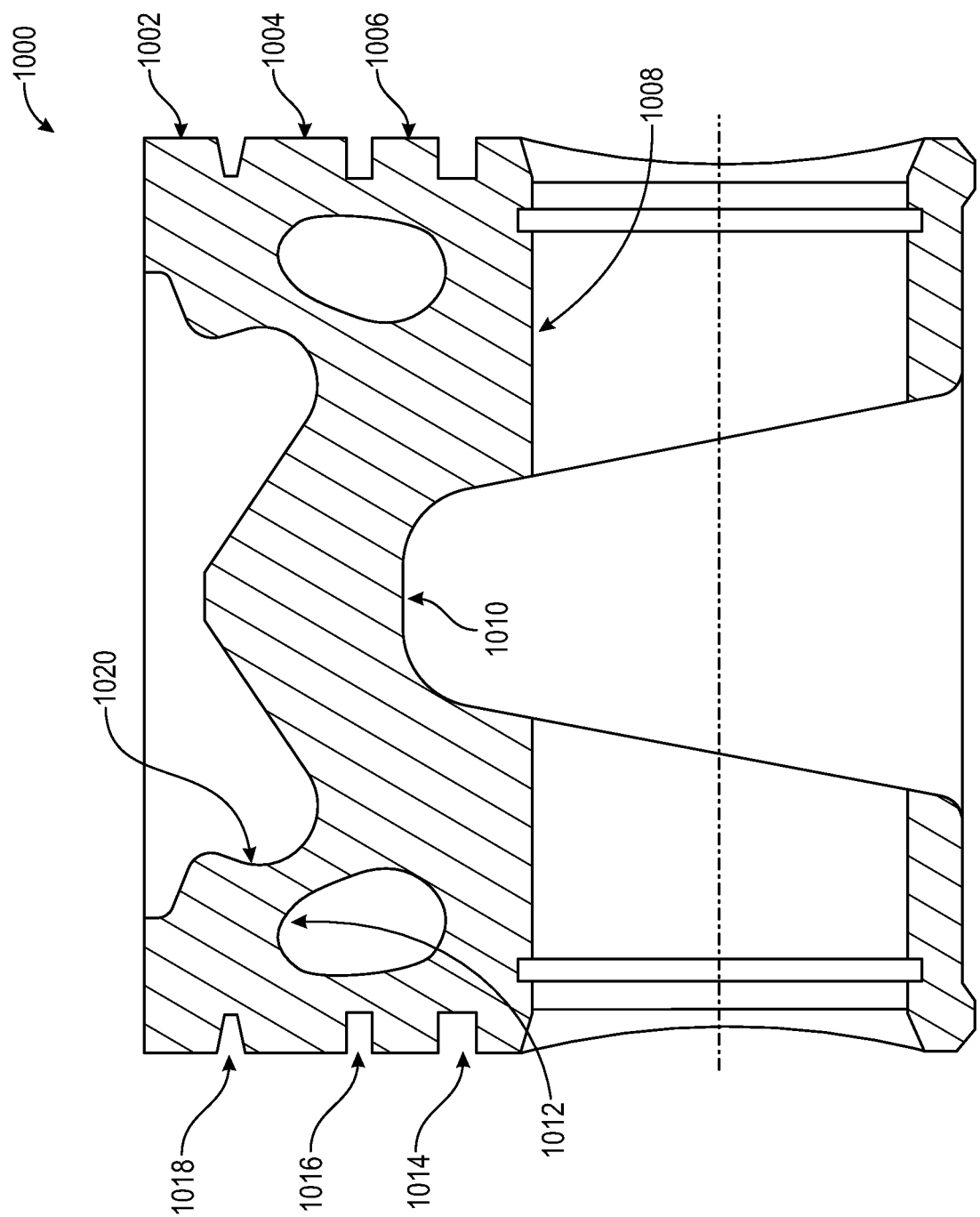
FIG. 10 is a sectional view illustrating certain aspects of an example piston.

With reference to FIG. 10, there is illustrated a sectional view of an example piston 1000 of the internal combustion engine 102. In the illustrated example, the piston 1000 includes a combustion bowl 1020 recessed in the crown of the piston 1000 that is directly exposed to combustion gasses within the cylinder bore of the internal combustion engine 102. The piston 1000 also includes a ring belt having a plurality of lands 1002, 1004, and 1006 separated from one another by ring grooves 1014, 1016, and 1018. An underside surface 1010 is formed on the opposite side of the combustion bowl 1020 with pin bores 1008 extending from the underside surface 1010. Due in part to the composition of the piston 1000, coking of fuel and engine oil results in deposits of carbon build-up on the surface of the various parts of the piston 1000. The increase of carbon deposition can lead to functional impairment of the piston 1000. For example, deposits and residue in the combustion bowl 1020, the cooling gallery 1012, and the underside 1010 can contribute to unfavorable influence in the combustion chamber such as, but not limited to, airflow, fluid (oil or fuel) flow, and piston movement. Similarly, carbon deposits on other parts such as the plurality of lands 1002, 1004, and 1006 and the ring grooves 1014, 1016, and 1018 may also negatively affect piston operation in the combustion chamber.

According to an example implementation, one or more portions of the piston 1000 may be provided with a catalytic coating according to the present disclosure. For example, to reduce carbon build-up, the catalytic based coating may be applied to one or more of the combustion bowl 1020, the cooling gallery 1012, the underside 1010 of the piston 1000, the plurality of lands 1002, 1004, and 1006 and the ring grooves 1014, 1016, and 1018.

Figure 11:
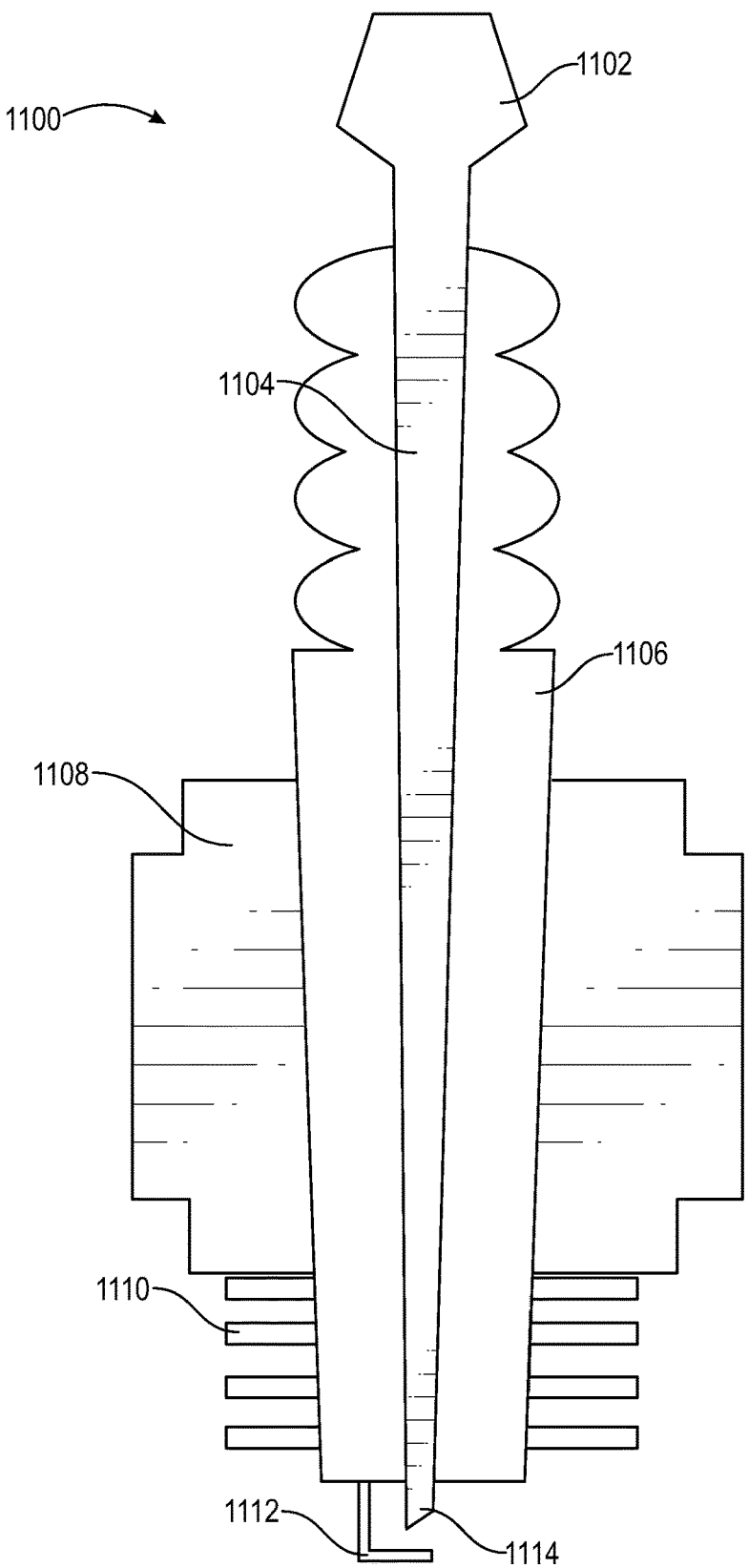
FIG. 11 is a schematic diagram illustrating certain aspects of an example spark plug.

A catalytic coating according to the present disclosure may be provided on number of other engine system components. FIG. 11 illustrates a spark plug including a first electrode and a second electrode, namely a center electrode and ground electrode, which may be provided with a catalytic coating according to the present disclosure. Other embodiments may include additional grounding electrodes or center electrodes which may be provided with a catalytic coating according to the present disclosure. The metal threads may additionally or alternatively be provided with a catalytic coating according to the present disclosure, for example, on one or more of their inside diameter, outside diameter, and end face.

Figure 12:
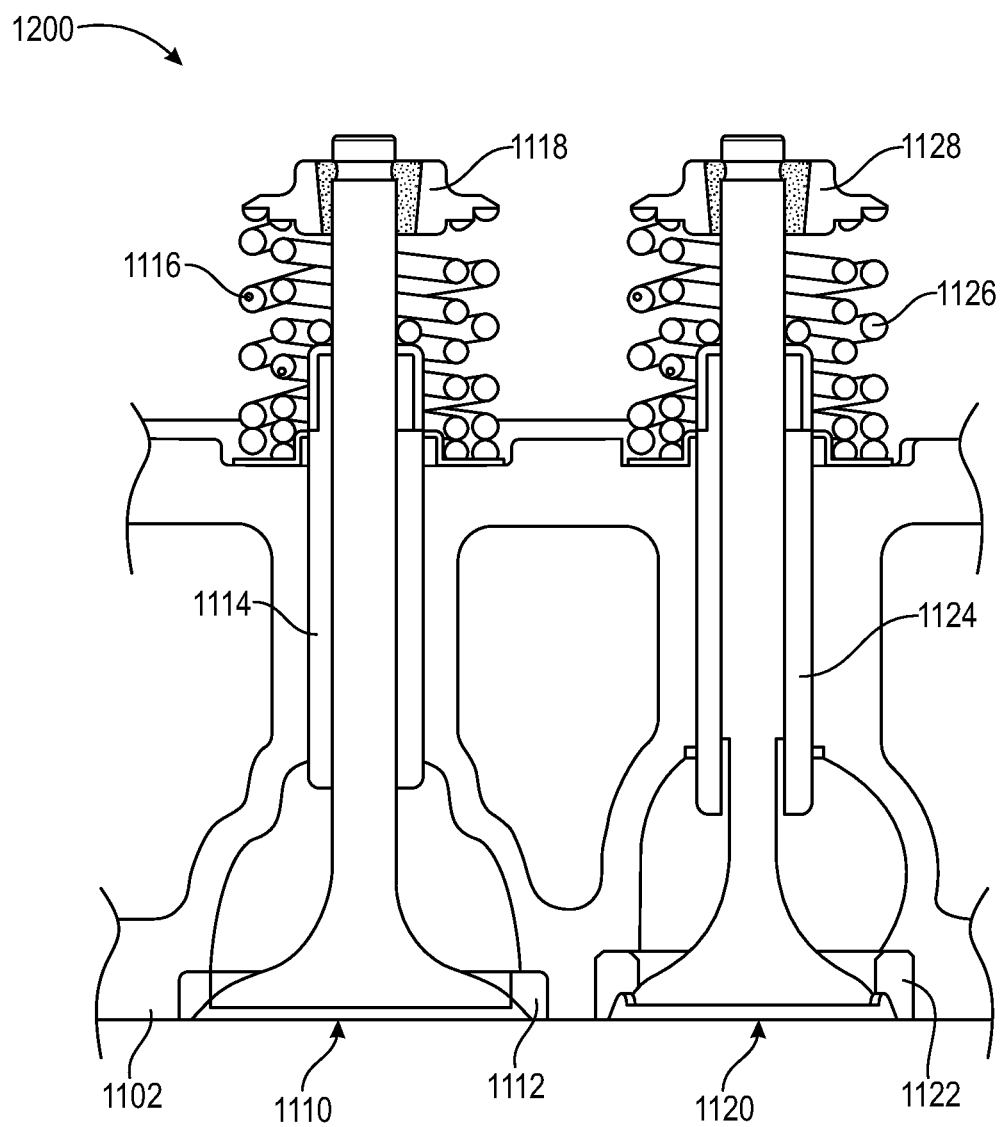
FIG. 12 is a sectional view illustrating certain aspects of an example intake and exhaust valve system.

FIG. 12 illustrates a cylinder head, an engine intake valve and an intake valve seating insert, and an engine exhaust valve and an exhaust valve seating insert. At least a portion of the intake valve (e.g., a portion contacting intake valve seating insert) may be provided with a catalytic coating according to the present disclosure. The intake valve seating insert may additionally or alternatively be provided with a catalytic coating according to the present disclosure. At least a portion of the exhaust valve (e.g., a portion contacting exhaust valve seating insert) may be provided with a catalytic coating according to the present disclosure. The exhaust valve seating insert may additionally or alternatively may be provided with a catalytic coating according to the present disclosure.

In certain embodiments, the bottom edge and face of the intake valve that are exposed to combustion gas may additionally or alternatively be provided with a catalytic coating according to the present disclosure. In certain embodiments, the head and sealing surface that are exposed to intake air of the intake valve which may additionally or alternatively be provided with a catalytic coating according to the present disclosure. In certain embodiments, the bottom edge and face of the exhaust valve that are exposed to combustion gas may additionally or alternatively be provided with a catalytic coating according to the present disclosure. In certain embodiments, the head and sealing surface that are exposed to exhaust gas may additionally or alternatively be provided with a catalytic coating according to the present disclosure.

Figure 13:
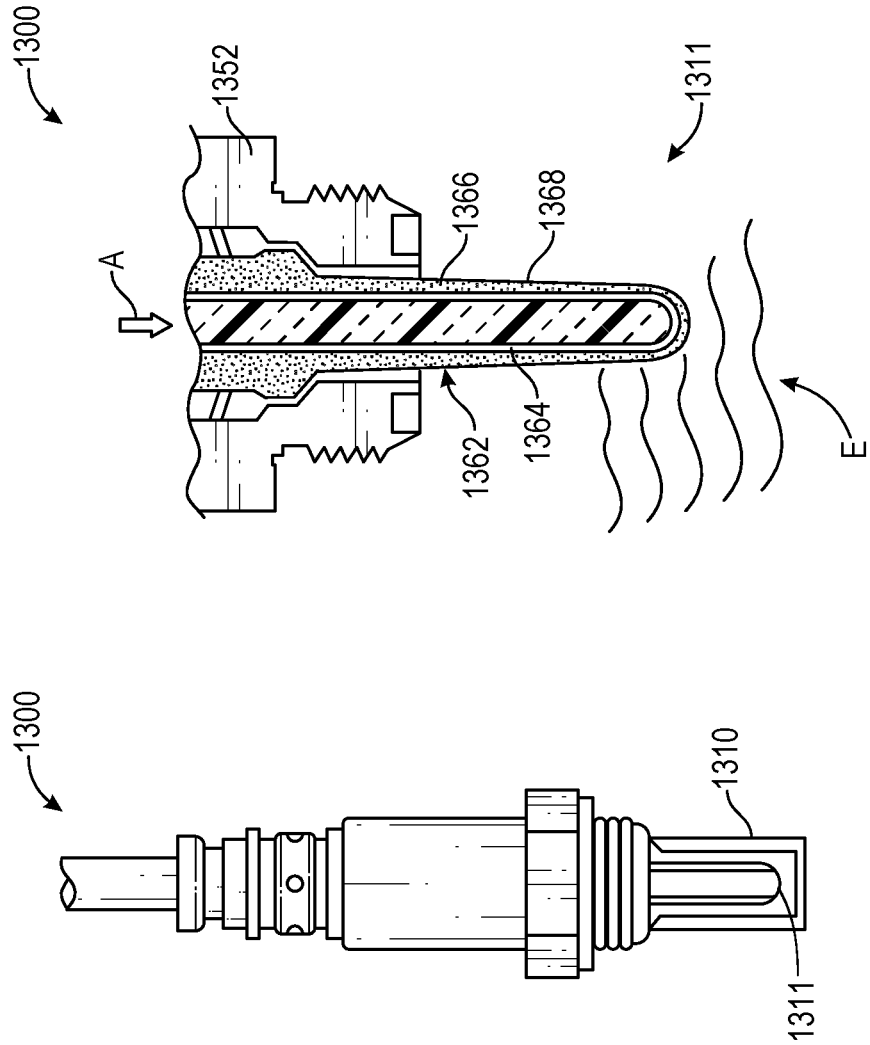
FIG. 13 illustrates an example $O_2$ sensor.

A number of sensors may also include portions provided with a catalytic coating according to the present disclosure. FIG. 13 illustrates an $O_2$ sensor 1300 which is provided in the form of a cup-type $O_2$ sensor and includes a sensor cover 1310 and a sensor tip 1311 area which are exposed to exhaust gas E and which may be provided with a catalytic coating according to the present disclosure. The $O_2$ sensor 1300 also includes a housing 1352 which partially contains sensor tip 1311 and from which a portion of the sensor tip 1311 extends. The sensor tip 1311 includes a zirconia or other ceramic sensor element 1362 including a platinum electrode 1366 covered by a zirconia or other ceramic coating 1368 and a heater 1364 configured to heat the sensor element 1362. An interior surface of the sensor element 1362 is exposed to the outside air A and an exterior surface of the sensor element 1362 is exposed to the exhaust gas E. The sensor element 1362 generates a voltage according to the oxygen concentration of the exhaust gas and outside air. A catalytic coating according to the present disclosure may be provided on a portion of any of the structured exposed to the exhaust gas E including, for example the cover 1310 or exposed portions of the sensor tip 1311 to a thickness and extent that such coating will not interfere with the sensing function of the sensor element 1362, for example, on inactive or non-sensing locations or surfaces or in corners or other boundary or discontinuous features or locations where carbon accumulation is typically observed on the $O_2$ sensor 1300.

Figure 14:
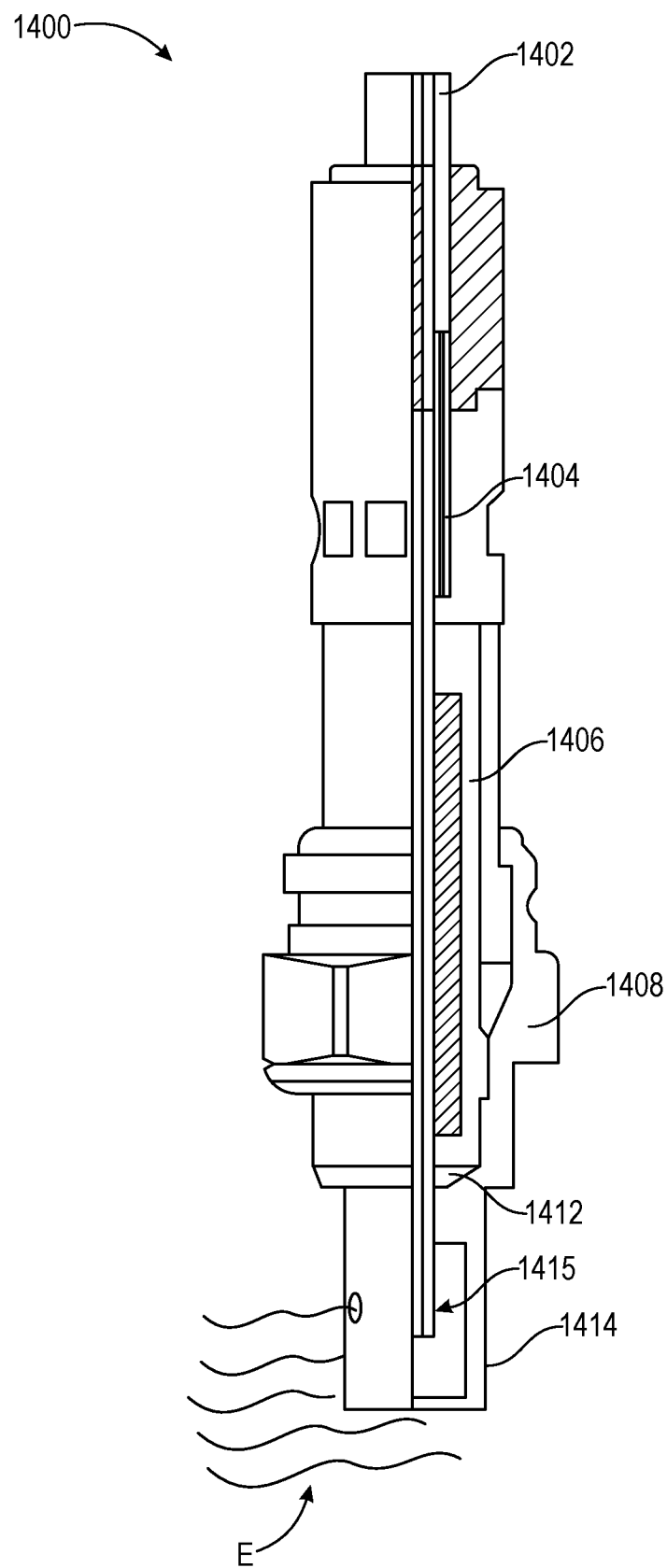
FIG. 14 illustrates an example $NO_x$ sensor.

FIG. 14 illustrates a $NO_x$ sensor 1400 including a protection tube or sensor cover 1414 and a sensor tip area 1415 which are exposed to exhaust gas and be provided with a catalytic coating according to the present disclosure. The $NO_x$ sensor 1400 also includes a lead wire 1404, an electrode 1406, a shell or housing 1408, and a heater element 1412. A catalytic coating according to the present disclosure may be provided on a portion of any of the structured exposed to the exhaust gas E including, for example protection tube or sensor cover 1414 and a sensor tip area 1415 to a thickness and extent that such coating will not interfere with the sensing function of the sensor tip area 1415, for example, for example, on inactive or non-sensing locations or surfaces or in corners or other boundary or discontinuous features or locations where carbon accumulation is typically observed on the $NO_x$ sensor 1400.

Figure 15:
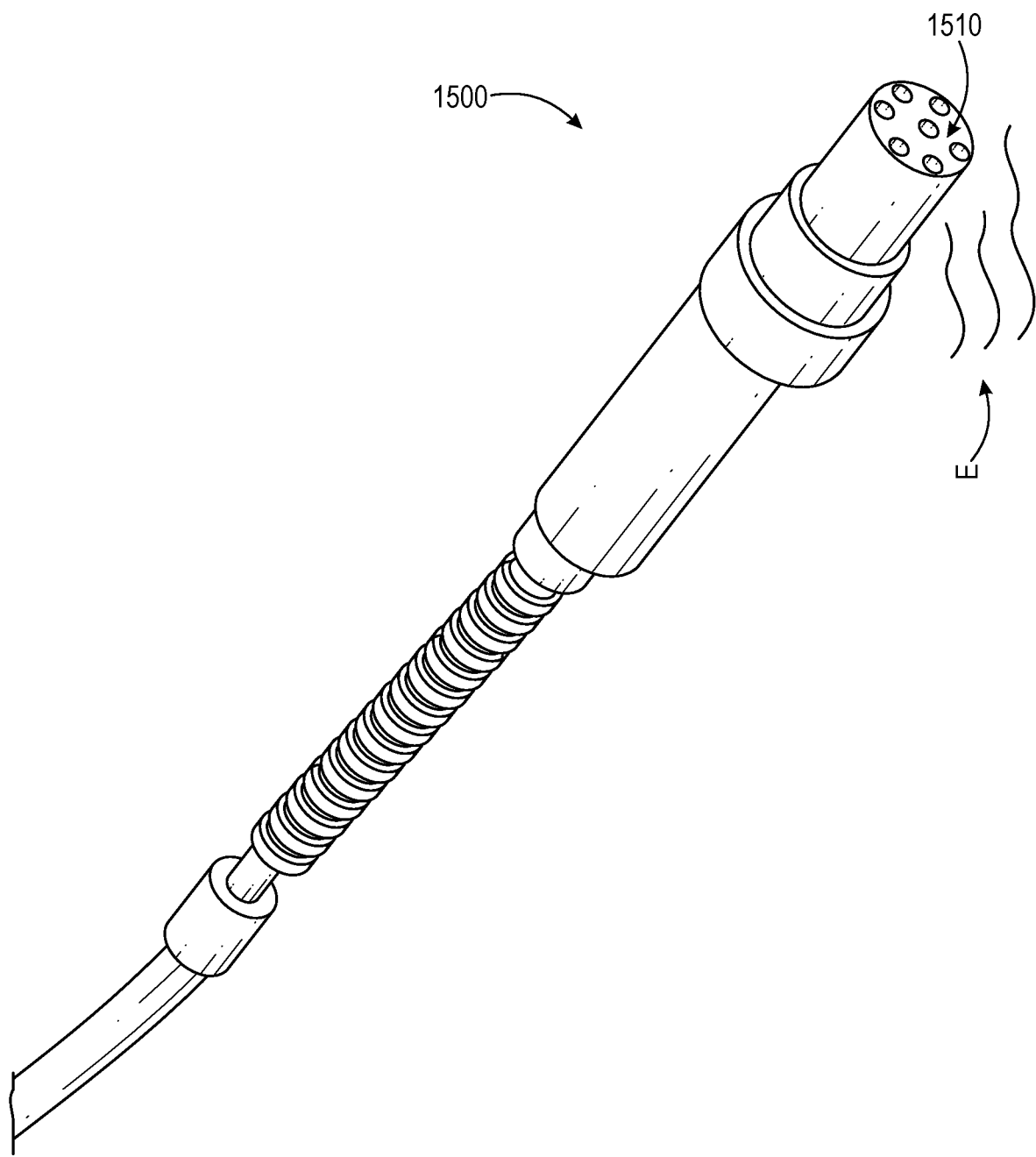
FIG. 15 illustrates an example particulate matter sensor.

FIG. 15 illustrates a particulate matter sensor 1500 including a sensor tip area 1510 including an exterior face and a plurality of apertures and corresponding sensor tubes extending into the sensor from the exterior face. The sensor tip area 1510 which is exposed to exhaust gas and may be provided with a catalytic coating according to the present disclosure to a thickness and extent that such coating will not interfere with the sensing function of the sensor tip area 1510 on inactive or non-sensing locations or surfaces or in corners or other boundary or discontinuous features or locations where carbon accumulation is typically observed on the particulate matter sensor 1500.

Several example embodiments shall now be further described. One example embodiment is an apparatus comprising: an exhaust gas recirculation (EGR) valve body comprising a flow passage extending between a gas inlet and a gas outlet; and an EGR valve comprising a head and a shaft moveable within the interior flow passage to selectably seat and unseat a head seating surface of the head from a body seating surface of the EGR valve body; wherein a catalytic coating is provided on at least one of: at least a portion of the head seating surface, at least a portion of the body seating surface, and at least a portion of the shaft. In certain forms, the catalytic coating comprises one or more noble metals. In certain forms, the catalytic coating is provided on at least a portion of the head seating surface and at least a portion of the body seating surface. In certain forms, the catalytic coating is provided on at least a portion of the shaft which moves in and out of the interior flow passage as the EGR valve moves to selectably seat and unseat the head seating surface of the valve head from the body seating surface of the EGR valve body. In certain forms, the catalytic coating is provided on at least each of the portion of the head seating surface, the portion of the body seating surface, and the portion of the shaft. In certain forms, the catalytic coating is provided on one of 70% or more, 80% or more, and 90% or more of the outer surface of the EGR valve. In certain forms, the catalytic coating is provided on one of 70% or more, 80% or more, and 90% or more of the flow passage of the EGR valve body. In certain forms, the catalytic coating is applied to at least one of a portion of the EGR valve body and a portion of the EGR valve by spray coating. In certain forms, the catalytic coating is applied to at least one of a portion of the EGR valve body and a portion of the EGR valve by dip coating. In certain forms, the catalytic coating is applied to at least one of a portion of the EGR valve body and a portion of the EGR valve by electrostatic plating.

Another example embodiment is an apparatus comprising: an exhaust gas recirculation (EGR) cooler comprising a plurality of exhaust flow passages defined by a plurality of wall members extending between a gas inlet side and a gas outlet side; wherein a catalytic coating is provided on at least a portion of the plurality of exhaust flow passages. In certain forms, the apparatus comprises: a header plate positioned at the gas inlet side and including a plurality of apertures in flow communication with the plurality of exhaust flow passages; wherein the catalytic coating is provided on at least a portion of the header plate. In certain forms, the catalytic coating comprises one or more noble metals. In certain forms, the catalytic coating is provided on one of 25% or more, 30% or more, and 35% or more of the length of the plurality of exhaust flow passages as measured from the inlet side. In certain forms, the catalytic coating is applied by spray coating of at least one of (a) at least a portion of the plurality of exhaust flow passages, and (b) at least a portion of the header plate. In certain forms, the catalytic coating is applied by dip coating of at least one of (a) at least a portion of the plurality of exhaust flow passages, and (b) at least a portion of the header plate. In certain forms, the catalytic coating is applied by electrostatic plating of at least one of (a) at least a portion of the plurality of exhaust flow passages, and (b) at least a portion of the header plate. In certain forms, at least a portion of the catalytic coating is applied using a pressure differential between the gas inlet side and the gas outlet side. In certain forms, at least a portion of the catalytic coating is applied using air circulation toward at least one of the gas inlet side and the gas outlet side. In certain forms, at least a portion of the catalytic coating is applied prior to assembly of the EGR cooler.

A further example embodiment is an apparatus comprising: an EGR flow sensor including an interior surface wherein a catalytic coating according to the present disclosure is applied to at least a portion of the interior surface.

Another example embodiment is an apparatus comprising: a sensor configured to sense a characteristic of exhaust gas wherein a catalytic coating according to the present disclosure is applied to at least a portion of the sensor tip.

A further example embodiment is an apparatus comprising: a spark plug including a first electrode and a second electrode, wherein a catalytic coating according to the present disclosure is applied to at least one of (a) at least a portion of the first electrode and (b) at least a portion of the second electrode.

Another example embodiment is an apparatus comprising: an engine valve system, wherein a catalytic coating according to the present disclosure is applied to at least a portion of one or more of an intake valve, an intake valve seat, an exhaust valve, and an exhaust valve seat.

A further example embodiment is an apparatus comprising: a fuel injector including an injector nozzle and an injector needle, wherein a catalytic coating according to the present disclosure is applied to at least a portion of one or both of the injector nozzle and the injector needle. In certain forms, the catalytic coating according to the present disclosure is provided on at least a portion of: (a) a nozzle inner diameter surface, (b) the nozzle inner diameter surface and a nozzle sac surface, (c) the nozzle inner diameter surface, the nozzle sac surface, and a plurality of nozzle spray hole surfaces, (d) the nozzle inner diameter surface, the nozzle sac surface, the plurality of nozzle spray hole surfaces, and a needle tip, and (e) the nozzle inner diameter surface, the nozzle sac surface, the plurality of nozzle spray hole surfaces, the needle tip, and a nozzle outer diameter surface. In certain forms, the catalytic coating according to the present disclosure is provided on at least a combination of two or more of the nozzle inner diameter surface, the nozzle outer diameter surface, the nozzle sac surface, the plurality of nozzle spray hole surfaces, and the needle tip. In certain forms, the catalytic coating according to the present disclosure is provided on at least a combination of three of or more of the nozzle inner diameter surface, the nozzle outer diameter surface, the nozzle sac surface, the plurality of nozzle spray hole surfaces, and the needle tip. In certain forms, the catalytic coating according to the present disclosure is provided on at least the nozzle sac surface, the plurality of nozzle spray hole surfaces, and the needle tip. In certain forms, the catalytic coating according to the present disclosure is provided on at least a portion of one or more of a tip surface of the injector needle, a first shaft portion surface of the injector needle, and fluid channel body portion surface of the injector needle. In certain forms, the catalytic coating according to the present disclosure is provided on at least a portion of two or more of a tip surface of the injector needle, a first shaft portion surface of the injector needle, and fluid channel body portion surface of the injector needle.

Another example embodiment is an apparatus comprising: an internal combustion engine piston including one or more surface portions having a catalytic coating according to the present disclosure. In certain forms, the one or more surface portions comprises a cooling gallery of the piston. In certain forms, the one or more surface portions comprises underside of the piston. In certain forms, the one or more surface portions comprises a top land of the piston. In certain forms, the one or more surface portions comprises one or more ring grooves of the piston.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus comprising:
an exhaust gas recirculation (EGR) cooler comprising a plurality of exhaust flow passages defined by a plurality of wall members extending between a gas inlet side and a gas outlet side;
wherein a catalytic coating is provided on at least a portion of the plurality of exhaust flow passages.

2. The apparatus of claim 1 comprising:
a header plate positioned at the gas inlet side and including a plurality of apertures in flow communication with the plurality of exhaust flow passages;
wherein the catalytic coating is provided on at least a portion of the header plate.

3. The apparatus of claim 1 wherein the catalytic coating comprises one or more noble metals.

4. The apparatus of claim of any of claim 1 wherein the catalytic coating is provided on one of 25% or more, 30% or more, and 35% or more of the length of the plurality of exhaust flow passages as measured from the inlet side.

5. The apparatus of any of claim 1 wherein the catalytic coating is applied by spray coating of at least one of (a) at least a portion of the plurality of exhaust flow passages, and (b) at least a portion of the header plate.

6. The apparatus of any of claim 1 wherein the catalytic coating is applied by dip coating of at least one of (a) at least a portion of the plurality of exhaust flow passages, and (b) at least a portion of the header plate.

7. The apparatus of any of claim 1 wherein the catalytic coating is applied by electrostatic plating of at least one of (a) at least a portion of the plurality of exhaust flow passages, and (b) at least a portion of the header plate.

8. The apparatus of claim 1 wherein at least a portion of the catalytic coating is applied using a pressure differential between the gas inlet side and the gas outlet side.

9. The apparatus of claim 1 wherein at least a portion of the catalytic coating is applied using air circulation toward at least one of the gas inlet side and the gas outlet side.

10. The apparatus of claim 1 wherein at least a portion of the catalytic coating is applied prior to assembly of the EGR cooler.

* * * * *